United States Patent [19]
Stastny et al.

[11] 3,819,543
[45] June 25, 1974

[54] PRODUCTION OF CHLORINATED POLYETHYLENE FOAMS

[75] Inventors: Fritz Stastny, Ludwigshafen; Hans-Georg Trieschmann, Hambach; Rudolf Gaeth, Limburgeshof; Gerhard Zeitler, Hessheim; Boris Ikert, Manheim, all of Germany

[73] Assignee: BASF Aktiengesellschaft, Ludwigshafen/Rehin, Germany

[22] Filed: Sept. 18, 1972

[21] Appl. No.: 290,136

Related U.S. Application Data
[63] Continuation of Ser. No. 845,520, July 28, 1969, abandoned.

[30] Foreign Application Priority Data
Aug. 27, 1968  Germany.............................. 1769861

[52] U.S. Cl. ... 260/2.5 HA, 260/2.5 E, 260/94.9 H, 260/94.9 GD, 260/94.9 GA, 264/54
[51] Int. Cl........................ C08f 47/10, C08f 29/04
[58] Field of Search....... 260/2.5 HA, 2.5 E; 264/54

[56] References Cited
UNITED STATES PATENTS

| | | | |
|---|---|---|---|
| 3,098,831 | 7/1963 | Carr............................. | 260/2.5 HA |
| 3,498,934 | 3/1970 | Kraemer et al.............. | 260/2.5 HA |
| 3,651,183 | 3/1972 | Hesoda et al................ | 260/2.5 HA |

*Primary Examiner*—Wilbert J. Briggs, Sr.
*Attorney, Agent, or Firm*—Johnston, Keil, Thompson & Shurtleff

[57] ABSTRACT

Production of chlorinated polyethylene foams by heating a mixture of chlorinated polyethylene, a crosslinking agent and an expanding agent. The foams, which are flexible and self-extinguishing may be used for example as insulating material, upholstery padding and packaging components.

7 Claims, No Drawings

PRODUCTION OF CHLORINATED POLYETHYLENE FOAMS

This is a continuation of application Ser. No. 845,520, filed 7/28/69, and now abandoned.

This invention relates to a process for the production of chlorinated polyethylene foams obtained by heating a mixture of chlorinated polyethylene, a crosslinking agent and an expanding agent.

In the methods for the production of expanded plastics from ethylene polymers hitherto generally used gas-eliminating substances have been used as expanding agents which are mixed with the ethylene polymers at a temperature at which the gas-eliminating expanding agent does not decompose. Preforms in which the gas is dissolved which has been formed by decomposition of the expanding agent are prepared from the mixture in molds which are gastight and pressuretight when closed at a temperature at which the expanding agent decomposes.

An expandable preform is obtained which expands when kept at a moderately elevated temperature, for example at 130° C for 30 minutes. Expanded plastics obtained in this way have very fine cells. It is a considerable disadvantage of this method which is often referred to as compression molding, that preforms have to be made in gastight molds at a temperature of about 170° C. A pressure of more than 200 atmospheres is thus set up by the gas evolved by the decomposing expanding agent. Very sturdy presses are therefore required in order to withstand this pressure in the mold. In spite of this, it is only possible to prepare relatively small and thin preforms because the dimensions of the molds are limited by the power and size of the presses. Moreover, heating in order to cause decomposition of the expanding agent in the gastight molds followed by cooling is not a very efficient manufacturing method because these operations take too long.

A method is also known in which mixtures of thermoplastics, crosslinking agents and expanding agents are heated so that the mixtures expand. Difficulties arise when attempts are made to prepare expanded polyvinyl chloride or chlorinated polyethylene by this method because the chlorine-containing polymers crosslink only under extreme conditions at which decomposition of the polymers usually takes place, which is evidenced by marked discoloration.

The object of the invention is to provide a process for the production of self-extinguishing expanded plastics articles which does not have the said disadvantages and which can be carried out in a simple manner.

This object is achieved according to the invention by heating a mixture of a chlorinated polyethylene having a chlorine content of from 12 to 30% by weight, a crosslinking agent and an expanding agent to a temperature above the softening point of the polymer and 5° to 150° C above the decomposition temperature of the crosslinking agent and above the decomposition temperature of the expanding agent.

The process is particularly advantageous when the mixture is first heated to temperatures above the decomposition temperature of the crosslinking agent and then to temperatures above the decomposition temperature of the expanding agent.

Chlorinated polyethylene having a chlorine content of from 12 to 30% by weight is suitable for the process. When polymers having a higher chlorine content are used, the advantages of the process are only partially achieved or not at all. Polymers having a lower chlorine content are only incompletely self-extinguishing, i.e. they continue to burn after ignition. The chlorinated ethylene polymers should generally have molecular weights of from 20,000 to 200,000 and softening points of from 80° to 110° C. It is preferred to use chlorinated high pressure polyethylene.

The softening point of the chlorinated polyethylene is determined by the following method. Polymer particles (diameter about 1 mm) are placed between small sheets of glass and the sheets with the layer of particles are placed on a heatable plate under a microscope. Heating is carried out at a rate of 3° C per minute. The softening point is the temperature at which it is observed the particles begin to fuse together.

Various organic crosslinking agents generally known in industry are suitable for carrying out the process. These are products which decompose at high temperature into free radicals and cause the molecules of the polymer to crosslink. Of these products only those should be used which do not cause any crosslinking at the prescribed temperature for mixing the ethylene polymer, expanding agent and crosslinking agent. Peroxides which do not cause crosslinking until a relatively high temperature has been reached, preferably temperatures from 10° to 80° C above the softening point of the polymer, for example 1,3-bis-(tertiary-butylperoxy-isopropylbenzene) or dicumyl peroxide, are particularly suitable for the purpose. Generally from 0.05 to 2.5%, preferably from 0.1 to 1.5%, by weight of crosslinking agent with reference to the polymer is used.

The plastics composition also contains an expanding agent. Of these, chemical expanding agents have proved to be particularly suitable. These are liquid or solid compounds which decompose at elevated temperature with the formation of gaseous products or evolve gas. It is advantageous to choose expanding agents whose decomposition temperature is from 15° to 150° C above the softening point of the ethylene polymer. The decomposition temperature of the expanding agent should advantageously be from 5° to 70° C above the decomposition temperature of the crosslinking agent.

Examples of suitable expanding agents are: azodicarbonamide, p-carbomethoxy-N-nitroso-N-methylbenzamide, azoisobutyronitrile, N,N'-dinitrosopentamethylene-tetramine, N-nitroso-N-alkylamides of aromatic dicarboxylic acids, trans-N,N'-dinitroso-N,N'-dimethylhexahydroterephthalamide, N,N'-dimethyl-N,N'-dinitrosoterephthalamide and diphenylsulfone-3,3'-disulfohydrozide.

The expanding agents are contained in the compositions in amounts of from 2 to 25%, advantageously from 5 to 15%, by weight with reference to the polymer.

The expandable compositions may contain a great variety of additives, such as other polymers, dyes, fillers, pigments or flame retardants as well as synergists which enhance the flame-retardant action of the halogens.

The production of these mixtures is carried out in conventional mixing equipment used in the plastics industry, for example on roll mills, in an extruder or in a kneader. In the production of the mixture care must be taken to ensure that the chlorinated ethylene polymer is soft enough so that homogeneous mixing is possible. The lowest possible temperature at which no decomposition of the crosslinking agent and no elimination of gas from the expanding agent take place is chosen for this mixing process. It is particularly advantageous to effect mixing in an extruder because as the mixture is extruded it can be granulated. The mixtures are advantageously prepared at temperatures of from 95° to 120° C.

It is convenient to expand the mixtures in the form of individual particles in molds and to fuse them together so that a molded article is obtained whose dimensions correspond to those of the cavity of the mold.

Heating of the particles is carried out in closed molds. By closed molds we mean molds whose walls are rigidly joined together. The molds should be so constructed that when the particles are heated the air of other gaseous or liquid constituents can escape from the mold, but not the expanded particles. It is advantageous to use molds whose walls are perforated or in whose walls small-bove nozzles are provided through which the heating medium can penetrate into the mold and the air can escape from the mold. Heating in the molds can advantageously be carried out in an atmosphere of nitrogen, for example by injecting heated nitrogen.

The term closed molds also includes continuous shaping apparatus such as is used for the continuous production of moldings from particulate expanded plastics. Such apparatus may consist for example of four continuous belts so arranged that a channel is formed. The expanded particles are fed into the channel at one end and expanded, and the strand is discharged at the other end of the channel. The belts may also be of the apron type. For the production of wide sheeting, only two parallel belts are usually necessary, stationary or movable walls being arranged at the sides so that the system forms a channel. In some cases molds which are open at the top may be used, hot air being injected between the mechanically moved expanded particles from the open side.

When carrying out the process starting from individual particles, care should be taken to ensure that heating takes place relatively quickly, for example in a through-circulation oven, in a press or by hot air or nitrogen, in order to keep the heating period as short as possible. It is necessary to carry out exhaustive tests in order to prepare expanded plastics under optimum conditions from specific types of ethylene polymer.

Heating of the particles may be effected by hot air, infrared radiation, high frequency dielectric energy or other hot media, including liquid media. The particles expand when heated and fuse together to form a molding whose dimensions correspond to those of the cavity of the mold. It is possible to prepare by the process according to the invention foams in the form of boards and blocks or even moldings of intricate shape, for example figures, pipe jacketing, lifebelts, window dummies, advertising articles and the like. After the particles have been heated and fused together in the mold, the molding must be cooled to a temperature which is from 20° to 50° C below the softening point of the polymer before it can be removed from the mold.

Care should be taken when heating to ensure that the heating period is only long enough to form the shaped article, and that cooling is then effected. Overheating the particles in the mold may in some cases result in a loss in volume. A specific heating period must therefore be chosen which depends on the type of mold and the composition of the mixture.

In making the molding, the size of the original cavity may be varied after heating in order to increase or decrease the density of the article. It is also possible to incorporate reinforcement materials, for example wire netting, steel inserts, tubes and the like, in the foams. The material may also be expanded directly into cavities for example in buoys or in composite elements between the outer faces, i.e. it may be used to fill these cavities. The foam may for example be used to fill fishing gear which is to remain permanently buoyant. The articles may additionally be coated in the usual way. They may be colored, printed, cut, drilled, stuck, covered with other materials, sewn into cloth and the like. The expanded plastics are of predominantly closed cell structure. They are highly flexible, resilient, soft, rotproof, and resistant to chemicals and solvents.

The foams are suitable as waterproof insulating material for the production of floats, upholstery padding, packaging components, toy figures, linings for clothing, insulating material in vehicles and ships, thermal and acoustic insulating material, shock-absorbing layers, expansion joints, insulating material in buildings and quite generally for applications where high flexibility is advantageous, for example for decorative purposes.

The invention is illustrated by the following Examples. The parts specified in the Examples are parts by weight, the percentages % by weight.

EXAMPLE

A mixture of 1000 parts of chlorinated polyethylene (softening point 100° C) which has been obtained by the action of gaseous chlorine on particulate high pressure polyethylene in the gas phase and has a chlorine content of 25% and a molecular weight of 150,000, 5 parts of 1,3-bis-(tertiary-butylperoxyisopropylbenzene) (decomposition temperature 150° C), 50 parts of azodicarbonamide (decomposition temperature from 180° to 200° C), 50 parts of stearic acid, 50 parts of zinc oxide and 100 parts of powdered antimony trioxide is prepared in an extruder at 110° C and the extrudate is cut up into granules having a diameter of 5 mm.

25 g of the granules are introduced into a metal mold which is not gastight when closed and which consists of a bottom having a diameter of 10 cm, a cylindrical body having a height of 5 cm and a having a diameter of 10 cm. The mold is closed and kept for 25 minutes in a through-circulation oven at 180° C. A cylindrical very homogeneous expanded plastics article is formed in which the individual particles are so fused together that they cannot be torn apart. The molding has a density of 64 g/l and a gel content of 24%. It is suitable as a float.

What we claim is:

1. A process for the production of chlorinated polyethylene foam which comprises: forming a mixture of chlorinated polyethylene having a chlorine content of from 12 to 30% and a softening point of from 80° to 110° C, an organic peroxide cross-linking agent having a decomposition temperature of from 10° to 80° C above the softening point of the chlorinated polyethylene and an expanding agent having a decomposition temperature of from 5° to 70° C above the decomposition temperature of the crosslinking agent, passing said mixture through an extruder and dividing the extrudate into particles, placing said particles in a closed mold from which gas can escape, and heating said particles in the following sequence:
   a. heating the particles to a temperature of from 95° to 120° C, thus causing softening of the chlorinated polyethylene,
   b. raising the temperature to decompose the crosslinking agent, thus causing crosslinking of the chlorinated polyethylene, and thereafter
   c. raising the temperature further to decompose the expanding agent, thus causing foaming of the crosslinked chlorinated polyethylene.

2. A process as claimed in claim 1 wherein the chlorinated polyethylene used has a molecular weight of from 20,000 to 200,000 and a softening point of from 80° C to 110° C.

3. A process as claimed in claim 1 wherein the crosslinking agent used is dicumyl peroxide or 1,-3-bis-(tertiary-butyl-peroxyisopropylbenzene).

4. A process as claimed in claim 2 wherein the amount of crosslinking agent used is from 0.05 to 2.5% by weight with reference to the polymer used.

5. A process as claimed in claim 4 wherein the said percentage is from 0.1 to 1.5%.

6. A process as claimed in claim 1 wherein the expanding agent is used in an amount of from 2 to 25% with reference to the polymer.

7. A process as claimed in claim 6 wherein the said percentage is from 5 to 15%.

* * * * *